United States Patent
Nakano

(10) Patent No.: US 6,704,027 B2
(45) Date of Patent: Mar. 9, 2004

(54) PORTABLE TERMINAL

(75) Inventor: Hideo Nakano, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 167 days.

(21) Appl. No.: 09/827,172

(22) Filed: Apr. 6, 2001

(65) Prior Publication Data

US 2002/0039095 A1 Apr. 4, 2002

(30) Foreign Application Priority Data

Aug. 24, 2000 (JP) .................................. P2000-253342

(51) Int. Cl.⁷ .................................................. G09G 5/00
(52) U.S. Cl. ...................... 345/636; 345/629; 345/864; 345/744; 709/246
(58) Field of Search .............................. 345/636, 629, 345/864, 744; 709/246

(56) References Cited

U.S. PATENT DOCUMENTS

| 5,606,374 | A | * | 2/1997 | Bertram | 345/565 |
| 6,424,426 | B1 | * | 7/2002 | Henry | 358/1.15 |
| 2001/0015731 | A1 | * | 8/2001 | Ono | 345/636 |
| 2002/0072047 | A1 | * | 6/2002 | Michelson et al. | 434/307 |

FOREIGN PATENT DOCUMENTS

JP 11-191836 7/1999

* cited by examiner

*Primary Examiner*—Matthew C. Bella
*Assistant Examiner*—Tam Tran
(74) *Attorney, Agent, or Firm*—Jacobson Holman PLLC

(57) ABSTRACT

The present invention was made to solve the problem that users cannot check e-mail containing an attached image at a glance on conventional portable terminals. According to the present invention, there is provided a portable terminal that can display the e-mail text overlapped upon the attached image in an easy-to-see manner, and hence improve its usability as a mail receiving terminal.

An image processing/output means converts the attached image data into image data of a size corresponding to that of the display area, and processes the attached image data to correct either of the brightness and contrast thereof. Further, a character setting/output means sets display color of the mail text according to the chromaticity of the image data so that the mail text will be overlapped upon and displayed with the set display color against the background of the processed image.

5 Claims, 4 Drawing Sheets

PORTABLE TERMINAL

BACKGROUND OF THE INVENTION

1. Field of the Invention

This invention relates to a potable terminal having a function for sending and receiving e-mail, and in particular, to a potable terminal that can display e-mail with an image attached thereto together with the attached image in an easy-to-see manner, and hence improve its usability.

2. Description of the Related Art

One method for attaching image data to e-mail on the Internet is such that image data, typically of a binary file, is converted into a text in a format such as Base 64 or Uuencode to send out the same immediately preceded by the e-mail text. Then, when the e-mail is received at a computer or portable terminal, an electronic mail application automatically detects the attached file part immediately preceded by the e-mail text to return the file to its original state and store the same.

There are various ways to display the e-mail text and the attached image received, depending upon the type of e-mail terminal used. In this case, if the display area of the terminal is too small, the e-mail text and the attached image may not be displayed at the same time.

For example, a personal computer or portable terminal such as PDA (Personal Digital Assistants) the display area of which is relatively large can display the attached image in an area adjacent to the display area of the e-mail text. Even if the image is too large to be displayed on the screen, it can scroll around the image alone or the image plus the e-mail text to obtain such high viewability as to withstand some degree of usage.

One prior art related to a display of image information such as e-mail is disclosed in Japanese Patent Application Laid-open No. 11-191836 entitled Communication Apparatus and its Control Method. (Applicant: Canon, Inventors: Hideo Shibaoka et al.) published on Jul. 13, 1999.

This prior art discloses a communication apparatus and its control method designed to store a received or photographed image in association with prestored information on the communication partner and the like, and to edit and display the communication partner information and the image on one screen. This makes it possible to refer to the image and the communication partner information at the same time, and hence easy to retrieve any image.

However, when e-mail with image data attached thereto is to be displayed on a terminal the display area of which is too small like a portable telephone, another method for displaying the same is employed. In this method, the attached image is displayed below the e-mail text. Then, a screen scroll function to scroll around the attached image is so used that the full-length image will be displayed step by step, thus browsing the e-mail text and the attached image continuously in this order.

However, it is almost impossible for the above-mentioned conventional portable terminal, especially the one with a small display area, to provide a concurrent display of the e-mail text and the attached image, which results in inconvenience for the user because he or she cannot check the e-mail containing the attached image at a glance.

SUMMARY OF THE INVENTION

It is an object of the present invention to provide a portable terminal that can display an e-mail text by overlapping the same upon an attached image, and hence improve its usability as an e-mail receiving terminal.

According to one aspect of the present invention, there is provided a portable terminal including: a receiver for receiving image data and character data transmitted in association with each other; an input unit for inputting instructions; a control unit for generating display data from the image data and the character data; and a display unit for displaying the display data. The portable terminal features that the control unit generates the display data in such a manner that the associated character data are overlapped upon and displayed against the image data as the background. This makes it possible to display the received image and character data on one screen in an easy-to-see manner, and hence improve its usability.

According to another aspect of the present invention, the above-mentioned portable terminal is such that the character data represent an e-mail text and the image data represent an image attached to the e-mail. This makes it possible to display the character data of the e-mail with the image data attached thereto together with the image data on one screen in an easy-to-see manner, and hence improve its usability.

According to still another aspect of the present invention, the above-mentioned portable terminal is such that the control unit converts the received image data into image data of a size corresponding to the display area of the display unit to generate the display data. Therefore, even if the display area is smaller than the size of the received image data, the received image and character data can be displayed on one screen in an easy-to-see manner, thus improving its usability.

According to yet another aspect of the present invention, the above-mentioned portable terminal is such that the control unit processes the received image data to correct either or both of the brightness and contrast thereof to generate the display. Therefore, when the character data are overlapped upon and displayed against the background of the received image data, the image data are made inconspicuous, thereby displaying the character data in an easy-to-see manner even in such bad condition that the characters are overlapped upon the image.

According to yet another aspect of the present invention, the above-mentioned portable terminal is such that the control unit sets display color of the received character data according to the chromaticity of the image data to generate the display data. Therefore, when the character data are overlapped upon and displayed against the background of the received image data, the image data are made inconspicuous, thereby displaying the character data in an easy-to-see manner even in such bad condition that the characters are overlapped upon the image.

According to still another aspect of the present invention, the above-mentioned portable terminal is such that, when two or more kinds of image data are received, the control unit changes the image data to be displayed as the background in accordance with instructions from the input unit. This makes it easy to change the image data to be displayed as the background, thus improving its usability.

BRIEF DESCRIPTION OF THE DRAWINGS

By way of example and to make the description more clear, reference is made to the accompanying drawings in which.

DESCRIPTION OF REFERENCE NUMERALS

Figure 1:
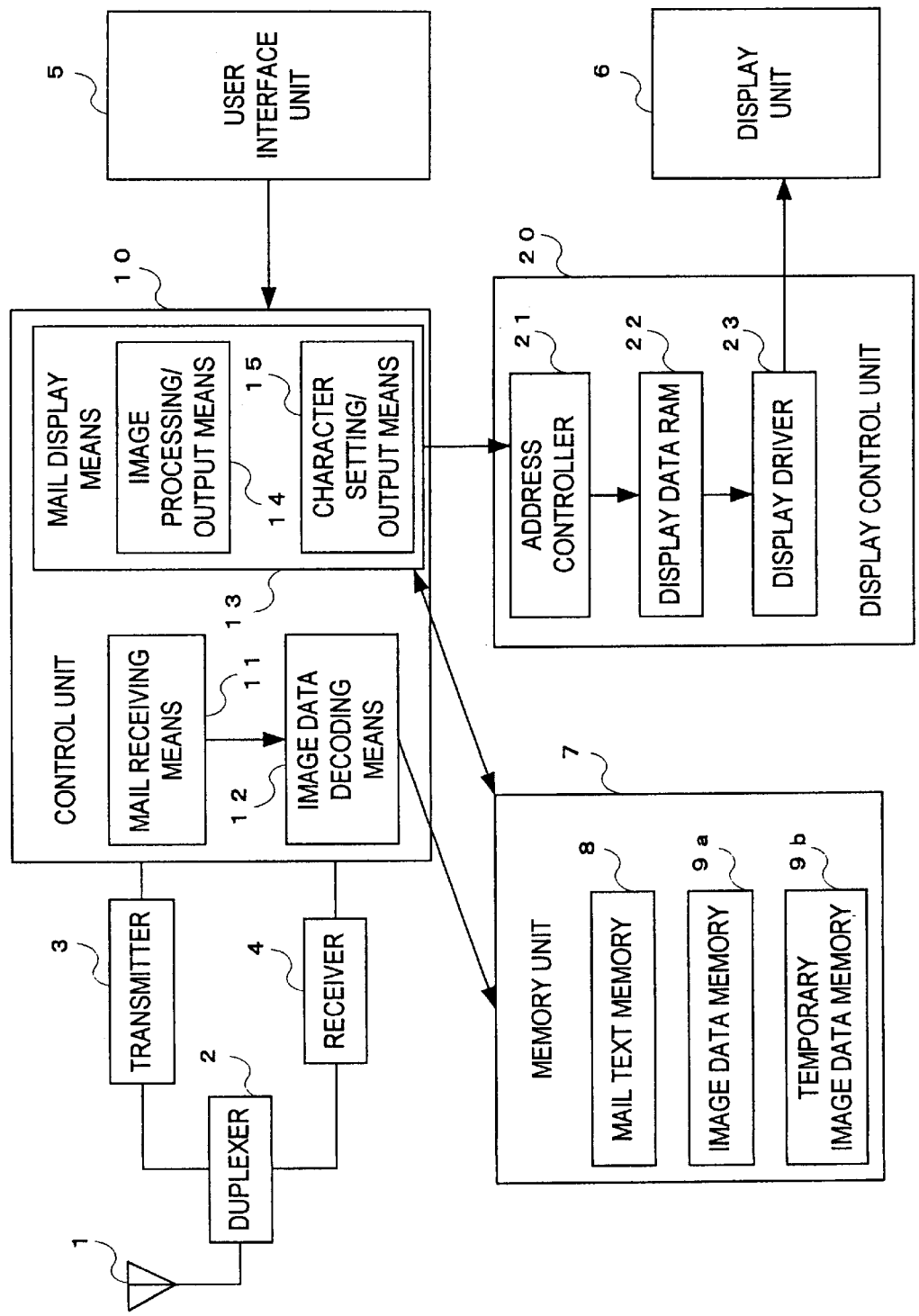
FIG. 1 is a block diagram of a configuration of a portable terminal according to the present invention.

1. Antenna,
2. Duplexer,
3. Transmitter,
4. Receiver,
5. User Interface Unit,
6. Display Unit,
7. Memory Unit,
8. Mail Text Memory,
9a. Image Data Memory,
9b. Image Data Memory,
10. Control Unit,
11. Mail Receiving Means,
12. Image Data Decoding Means,
13. Mail Display Means,
14. Image Processing/Output Means,
15. Character Setting/Output Means,
20. Display Control Unit,
21. Address Controller,
22. Display Data RAM,
23. Display Driver.

DESCRIPTION OF THE PREFERRED EMBODIMENT

The following describes an embodiment of the present invention with reference to the accompanying drawings.

It should be noted that function performing means to be described below can be any means as long as they perform the functions concerned. In other words, the mean scan be any circuit or device, or part or all of the functions may be performed by software. Further, the function performing means may consist of two or more circuits, or two or more function performing means may be of a single circuit.

The portable terminal according to the present invention is designed to receive character data and image data transmitted in association with each other, convert the received image data into image data of a size corresponding to that of the display area, correct either or both of the brightness and contrast of the image data, and set display color of the received character data according to the chromaticity of the image data to generate display data. Since the associated character data are overlapped upon and displayed against the background of the received image data, even if the display area is smaller than the size of the received image data, the received image and character data can be displayed on one screen in an easy-to-see manner. Further, since the image data become inconspicuous and the character data stand out against the background, the character data can be displayed in an easy-to-see manner even in such bad condition that the characters are overlapped upon the image. Thus the usability of the portable terminal is improved.

In particular, when the character data represent an e-mail text and the image data represent an image attached to the e-mail, the portable terminal according to the present invention can display the character data of the e-mail with the image data attached thereto together with the image data on one screen in an easy-to-see manner, thereby improving its usability.

As for the function performing means, the portable terminal according to the present invention includes a receiver for receiving image data and character data transmitted in association with each other and an input unit for inputting instructions. The portable terminal also includes a control unit that converts the image data into image data of a size corresponding to the display area, processes the image data to correct either or both of the brightness and contrast thereof, and sets display color of the character data according to the chromaticity of the image data to generate display data from the image and character data in such a manner that the associated character data are overlapped upon and displayed against the background of the image data. Further, the portable terminal includes a display unit for displaying the display data. Therefore, even if the display area is smaller than the size of the received image data, the received image and character data can be displayed on one screen in an easy-to-see manner. Further, since the image data become inconspicuous and the character data stand out against the background, the character data can be displayed in an easy-to-see manner even in such bad condition that the characters are overlapped upon the image. Thus the usability of the portable terminal is improved.

Each means of the embodiment according to the present invention is made correspondent with each part or parts shown in FIG. 1. As shown, the receiver corresponds to an antenna 1, a duplexer 2 and a receiver 4. The control unit corresponds to a control unit 10, a memory unit 7 and a display control unit 20. The display unit corresponds to a display unit 6.

Referring first to FIG. 1, description will be made about a configuration of the portable terminal according to the present invention. FIG. 1 is a block diagram of the portable terminal according to the present invention.

The portable terminal according to the present invention is constituted of: the antenna 1 for transmitting and receiving radio waves; the duplexer 2 that enables common use of the antenna for transmission and reception; a transmitter 3 for controlling data transmission; the receiver 4 for controlling data reception; a user interface unit 5 such as a key pad for use in inputting various functions on the portable terminal; the display unit 6 for displaying input data or received e-mail; the memory unit 7 for storing various data; the control unit 10 for controlling the entire portable terminal; and the display control unit 20 for controlling indications on the display unit 6.

As for each part of the portable terminal according to the present invention, the antenna 1, the duplexer 2, the transmitter 3, the receiver 4, the interface unit 5 and the display unit 6 are the same in configuration as those of an existing portable terminal. Therefore, the description thereof will be omitted. Here, the parts related to the characteristics of the present invention will be described in detail below.

The memory unit 7 is a memory unit for storing various data related to the portable terminal. Particularly, in the embodiment, the memory unit 7 includes a mail text memory 8 for storing a received e-mail text (character data), an image data memory 9a for storing image data attached to the received e-mail, and a temporary image data memory 9b for temporarily storing processed image data.

It should be noted that the e-mail text stored in the mail text memory 8 and the image data stored in the image data memory 9a are so held that they can be read out in association with each other.

The display control unit 20 controls indications on the display unit 6; it consists of an address controller 21, a display data RAM 22 and a display driver 23.

The display data RAM 22 is a memory for storing display data to be indicated on the display unit 6.

The display driver 23 is a driver for driving the display unit 6 to indicate the display data stored in the display data RAM 22.

The address controller 21 is a controller that performs address control to the display data RAM 22 to write the display data into the display data RAM 22.

If the display data are character data, the address controller 21 converts the character data into dot data for character display, and controls the address to the dot data part for character display to write the display data onto the display data RAM 22 with a display color instructed by the control unit 10.

The above-described structural elements are the same in configuration as those of conventional portable terminals.

The portable terminal according to the present invention features that the contents to be processed by the mail display means 13 in the control unit 10 to be described below are different from those of the conventional. Such a characteristic function of the present invention can be mounted on software executed by the control unit 10.

The control unit 10 controls the entire portable terminal, that is, it performs various setting functions as well as communication and talking functions as a typical portable terminal. In the embodiment, the control unit 10 further has a function for transmitting and receiving e-mail on which the portable terminal according to the present invention is predicated.

According to the portable terminal of the present invention, the control unit 10 includes a mail receiving means 11, an image data decoding means 12, and a mail display means 13 as characteristic parts of the present invention related to the reception and display of e-mail. The mail display means 13 includes an image processing means 14 and a character setting/output means 15.

The mail receiving means 11 is a means for receiving e-mail. If no file is attached to the e-mail, the mail receiving means 11 stores the e-mail into the mail text memory 8 as it is while if a file (image data) is. attached to the e-mail, it stores them into a temporary memory, not shown, and activates the image data decoding means 12.

The image data decoding means 12 decodes the image file encoded by the sending side in a format such as Base 64 or Uuencode to generate binary image data. According to the present invention, the image data decoding means 12 is activated by the mail receiving means 11 in response to reception of e-mail with a file (image data) attached thereto. After activated, the image data decoding means 12 detects the image data part attached to the e-mail text to decode the image data. Then, the e-mail text is stored into the mail text memory 8, while the image data are stored into the image data memory 9a. It should be noted that the e-mail text stored in the mail text memory 8 and the image data stored in the image data memory 9a are so held that they can be read out in association with each other.

The mail display means 13 is a means for displaying on the display unit 6 the received e-mail stored in the mail text memory 8 and the image data memory 9a.

To be more specific, the mail display means 13 is activated in accordance with instructions from the user interface unit 5 to perform the function for displaying the received e-mail. After activated, the mail display means 13 provides control of the display of either the e-mail text or the image, or both the e-mail text and the image data by overlapping the e-mail text upon the image data, depending on the display mode preset or changed during operation.

After the completion of the storage of either or both of the image and the character data of the mail text on the display data RAM 22 through the address controller 21, the display driver 23 reads out display data from the display data RAM 22 to output the same to the display unit 6. Thus the display data appear on the display unit 6.

There are the following display modes: a .text-only. mode for displaying e-mail text only, an .image-only. mode for displaying image data only, and an .image and text. mode for displaying e-mail text overlapped upon an attached image. Of all the modes, the .text-only. mode and the .image and text. mode can be preset. The .image-only. mode may be set during e-mail display so that only the attached image can be displayed by varying its scale.

Further, the image processing/output means 14 is so provided that the e-mail text and the attached image are displayed in an easy-to-see manner when the attached image is displayed. The image processing/output means 14 performs various processing for the received image data to instruct the display unit 6 to indicate the processed image data. On the other hand, the character setting/output means 15 is so provided that display color of the received e-mail text is set to instruct the display unit 6 to indicate the e-mail text with the set display color.

One specific example of the image processing carried out at the image processing/output means 14 comprises the following processing. First of all, image-size adjustment processing is so done that the image data received and stored in the image data memory 9a are adjusted in size to match the display area of the display unit 6. Second, image correction processing is so done that either or both of the brightness and contrast of the image are corrected to make the image inconspicuous and hence the characters easy to see when the characters of the e-mail text are overlapped upon and displayed against the image. It should be noted that both the image-size adjustment and the image correction use the temporary image data memory 9b to store the display image data subjected to the final processing onto the display data RAM 22 through the address controller 21 of the display control unit 20.

If only the image is displayed, image zooming is done in accordance with instructions from the user to perform a function for varying the display scale. If the image is zoomed in, the enlarged image data are stored into the temporary image data memory 9b of the memory unit 7 so that the entire image is displayed by scrolling. Then, the enlarged image data temporarily stored are output in accordance with instructions from the user interface unit 5 to scroll the image screen.

The image data thus generated are written onto the display data RAM 22 through the address controller 21.

It should be noted any specific method may be used to carry out the image-size adjustment, the image correction and the image zooming, and the present invention is not limited to the specific method.

Further, when the characters overlapped upon the image are displayed, the characters close in chromaticity to the attached image may not be readable. From this standpoint, the character setting/output means 15 would be a means for making the characters conspicuous and hence easy to see.

One specific example of methods for making the characters conspicuous is to set display color of the characters according to the chromaticity of the image data. Another example is to make two or more colors changeable in accordance with operations on the user interface unit 5. In this case, the chromaticity of the attached image data stored in the image data memory 9a of the memory unit 7 for use in generating the display data, or the chromaticity of the attached image data stored in the temporary image data memory 9b after processed by the image processing/output means 14 is so analyzed that the optimum, easy-to-seem color of the characters is selected on the basis of the analysis result and correspondence provided in advance to the analysis result. Further, colors of the characters may be varied step by step like .black., .white., .blue. and .red. by the user pressing specific keys assigned on the user interface unit 5.

Upon making a decision on the display color, the e-mail text is read out from the mail text memory 8 of the memory unit 7. Then, the character data of the e-mail text and the character color are output to the address controller 21. The address controller 21 writes only the dot part for character display over the image data stored on the display data RAM 22 to overlap the characters upon the image on the display data RAM 22.

Figure 2:
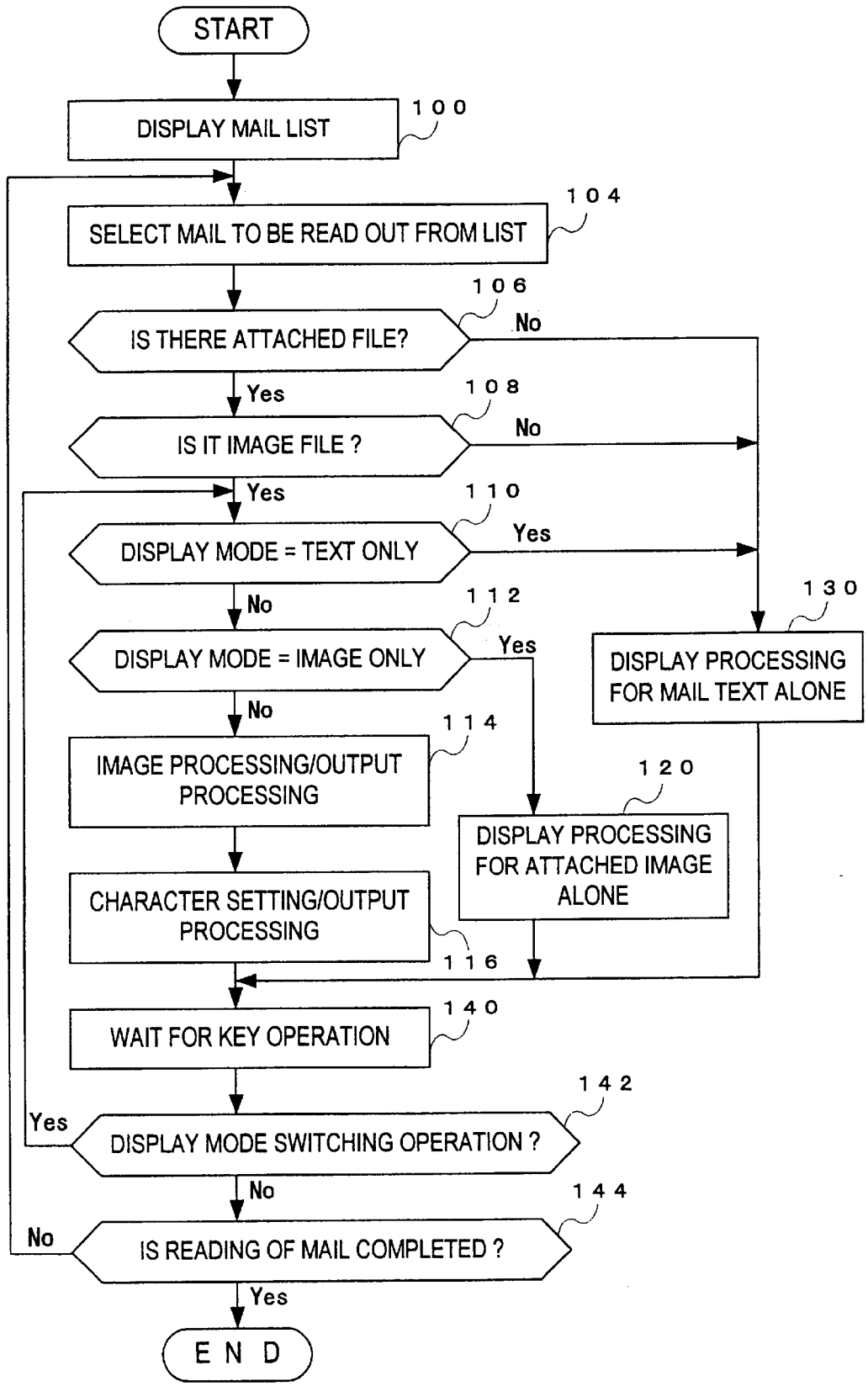
FIG. 2 is a flowchart showing the flow of operations executed by mail display means in a control unit of the portable terminal according to the present invention.

The following describes the flow of the mail display processing performed by the mail display means 13 with reference to FIG. 2. FIG. 2 is a flowchart showing the flow of the processing performed by the mail display means 13 in the control unit 10 of the portable terminal according to the present invention.

The mail display processing performed by the mail display means 13 in the control unit 10 of the portable terminal according to the present invention is activated in accordance with instructions from the user interface unit 5 to perform the function for displaying received e-mail. As shown in FIG. 2, a list of received e-mail stored in the mail text memory 8 is displayed on the display unit 6 (100). The user selects e-mail to be read out from the list through the user interface unit 5 (104). It is then determined whether or not a file is attached to the selected e-mail (106). If a file is attached (Yes), it is further determined whether or not the attached file is an image file (108).

If the attached file is an image data (Yes), it is determined whether the display mode is .text-only. (110), If not .text-only. (No), it is next determined whether the mode is .image-only. (112). IF not .image-only. (No), it is recognized that the image and text are to be displayed by overlapped one upon another, and therefore, the image processing/output means 14 is activated to perform the image processing/output processing (114). Then, the character setting/output means 15 is activated to perform the character setting/output processing (116).

The image processing/output processing performed by the image processing/output means 14 includes image-size adjustment processing for adjusting the size of the image to match the display area of the display unit 6, and image correction processing for correcting the brightness and/or contrast of the image to make the characters conspicuous and hence easy to see when the characters of the e-mail text are overlapped upon and displayed against the image.

The character setting/output processing performed by the character setting/output means 15 includes processing for selecting the optimum character color on the basis of the chromaticity of the image and processing for changing the character color at user.s discretion.

Consequently, the image data as the background and dot data for displaying the characters of the character data of the e-mail text are written onto the display data RAM 22 through the address controller 21, and displayed on the display unit 6 by means of the display driver 23.

Then, the procedure waits for key operation on the user interface unit 5 (140). It is determined whether display-mode switching operation is instructed from the user interface unit 5 (142). If the display-mode switching operation is instructed (Yes), the procedure returns to processing step 110 to perform processing according to the display mode. If not instructed (No), it is determined whether or not reading of the e-mail is completed (144). If not completed (No), the procedure returns to processing step 104 to repeat the display processing for another e-mail. If the reading of the e-mail is completed (Yes), the mail display processing is ended.

On the other hand, if it is determined in processing step 106 that there is no file (No), or in processing step 110 that the setting of the display mode is .text-only. (Yes), the display processing is done for the e-mail text alone. In other words, the address controller 21 is instructed to clear all the contents on the display data RAM 22. Then, the character data of the e-mail text stored in the mail text memory 8 are output to the address controller 21 (130). After that, the procedure goes to processing step 140.

In the case where only the e-mail text is displayed, the display color of the characters does not need to be adjusted, but part of the character setting/output means 15 may be used to tailor the display color of the characters to user.s liking.

Further, if it is determined in processing step 112 that the display mode is image-only. (Yes), the display processing is done for the attached image alone (120). Then, the procedure goes to processing step 140.

The display processing for the attached image alone includes image-size adjustment processing for adjusting the size of the image to match the display area of the display unit 6, and the image zooming processing for zooming in or out the image in accordance with instructions from the user to perform the function for varying the display scale. In particular, if scrolling is instructed from the user interface unit 5 during enlarged display, processing for displaying the entire enlarged image by scrolling is performed.

It should be noted that the image processing/output processing performed by the image processing/output means 14 may be either or both of the image-size adjustment processing and the image correction processing for correcting the brightness and/or contrast of the image. Further, in actuality, the mail display means 13 may realize either or both of the image processing/output means 14 and the character setting/output means 15.

Figure 3:
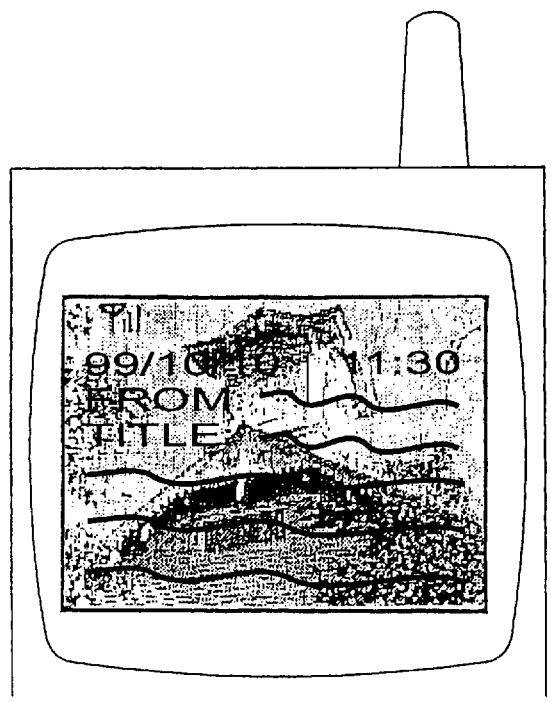
FIG. 3 is an illustration of an example of display on the portable terminal according to the present invention on which a text and an image are overlapped.
Figure 4:
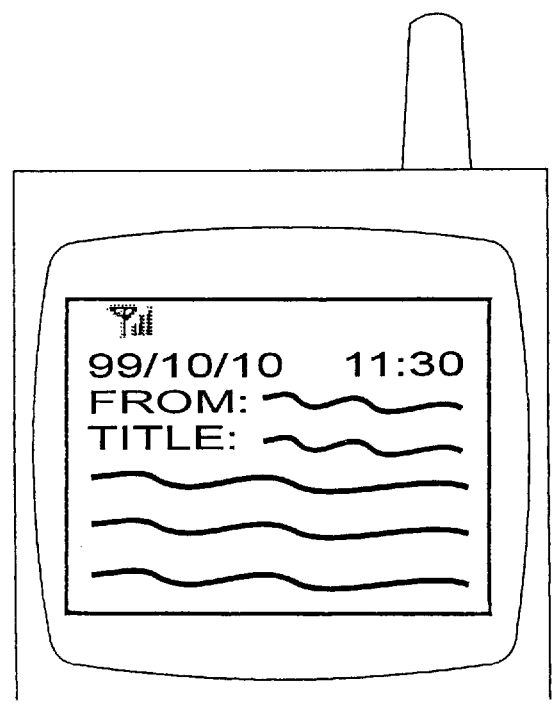
FIG. 4 is an illustration of an example of e-mail text-only display on the portable terminal according to the present invention.

Next, the operation of the portable terminal according to the present invention will be described on the basis of FIG. 1 by referring to specific examples of display shown in FIGS. 3 to 5. FIG. 3 shows an example of display on the portable terminal of the present invention on which an image and an e-mail text are overlapped. FIG. 4 shows an example of e-mail text-only display on the portable terminal of the present invention. FIG. 5 shows examples of image-only display on the portable terminal of the present invention, where (a) shows an example of entire image display and (b) shows enlarged image display.

According to the portable terminal of the present invention, the mail receiving means 11 of the control unit 10 performs e-mail reception processing through the antenna 1, the duplexer 2 and the receiver 4. If the received e-mail is text-only e-mail, character data of the text are stored in the mail text memory 8 of the memory unit 7.

On the other hand, if the received e-mail is e-mail with image data attached thereto, the image data decoding means 12 is operated to detect the image data part attached to the e-mail text. The character data of the text are stored in the mail text memory 8, while the image data is decoded and stored in the image data memory 9a.

Then, when the user instructs the display of the e-mail through the user interface unit 5, the display means 13 of the control unit 10 is activated. Suppose here that one of methods for displaying e-mail with image data attached thereto (display modes) is selected and set in advance from among e-mail text-only display, attached image-only display and display on which the attached image and the e-mail text are overlapped. However, the mode selected may be changed during display processing.

If the e-mail selected from the e-mail list contains an attached image, and the display mode is such a display mode as to overlap the attached image and the e-mail text, the mail display means 13 activates the image processing/output means 14 to read out the image data from the image data memory 9a. Then, the image processing/output means 14 adjusts the size of the image to match the display area of the display unit 6, and processes the image to correct the brightness and/or contrast thereof to make the characters easy to see when overlapped upon the image. The image data thus generated are written onto the display data RAM 22 through the address controller 22.

Next, the character setting/output means 15 is activated to read out the character data of the e-mail text from the mail text memory 8. Then, the character setting/output means 15 selects the optimum character color on the basis of the chromaticity of the image, or decides on the character color changed by the user. The character data of the e-mail text and the character color are output to the address controller 21. The address controller 21 converts the character data into dot data for the display of the characters with the specified character color for the purpose of overlapping the characters upon the image. Then, the address controller 21 performs address control to write only the dot part for character display over the image data on the display data RAM 22. Thus, the image and the characters are overlapped on the display data RAM 22 to generate display data.

The display data thus generated on the display data RAM 22 are output to the display unit 6 through the display driver 23. Then, as shown in FIG. 3, the e-mail text is displayed against the background of the attached image data.

On the other hand, if the display mode is the text-only mode, the mail display means 13 instructs the address controller 21 to erase all the data on the display data RAM 22. After the address controller 21 has erased the data on the display data RAM 22, the character data are output to the address controller 21. The address controller 21 converts the character data into the dot data for character display, and performs address control to write the dot data onto the display data RAM 22. The dot data written on the display data RAM 22 are output to the display unit 6 through the display driver 23 to display only the character data of the e-mail text as shown in FIG. 4.

Figure 5B:
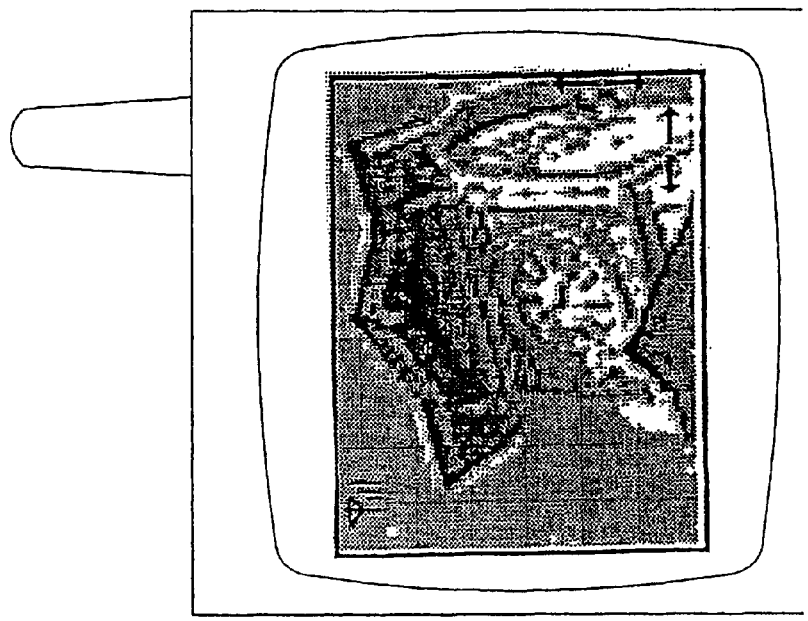
FIG. 5 is an illustration of examples of image-only display on the portable terminal according to the present invention.
Figure 5A:
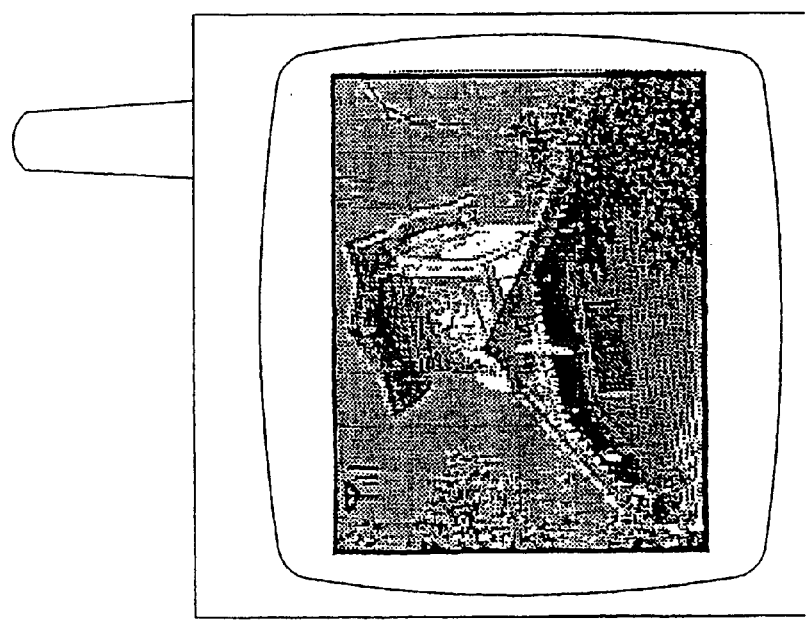

If the display mode is changed during the e-mail display processing in accordance with instructions from the user interface unit 5, the display mode .image-only. can be selected. When the .image-only. display mode is selected, the image processing/output means 14 is activated to read out the image data from the image data memory 9a. Then, the image processing/output means 14 adjusts the size of the image to match the display area of the display unit 6. The image data thus generated are written onto the display data RAM 22 through the address controller 21, and output to the display unit 6 through the display driver 23 to display only the image data as shown in FIG. 5(a).

The .image-only. display mode has a function for varying the display scale. For example, if the user instructs an enlarged display through the user interface unit 5, the image processing/output means 14 is operated to zoom in the received image data and store the same into the temporary image data memory 9b. Part of the enlarged image data (capable of being displayed) is written onto the display data RAM 22 through the address controller 21, and output to the display unit 6 through the display driver 23. Then, as shown in FIG. 5(b), the enlarged part of the attached image is so displayed that the user can check detailed portions. In such a case, marks such as arrows shown in the display example are indicated to let the user know that the image screen can be scrolled.

Then, if the user instructs scrolling through the user interface unit 5, the next scrolled part of the image data is read out from the temporary image data memory 9b according to the direction to be scrolled. The read part of the image data is written on to the display RAM 22 through the address controller 21, and output to and display on the display unit 6 through the display driver 23.

It should be noted that the received image data stored in the image data memory 9a of the memory unit 7 may be enlarged or zoomed in. Alternatively, the image processed to match the display size may be stored in the temporary image data memory 9b so that image enlargement or zooming is done on the basis of the image stored in the temporary image data memory 9b.

Further, if the display data RAM 22 can be of capacity higher than the display area of the display unit 6, the image data of the enlarged image may be written onto the display data RAM 22 so that the display driver 23 will provide scrolling control.

Although the above description was made about a case where an image is attached to an e-mail message, two or more images may be attached to the e-mail. In this case, the user may press specific keys assigned on the user interface unit 5 to change the images in order like .image 1., .image 2. and .image 3., regardless of whether or not the e-mail text is overlapped upon the image.

The above description was also made about the display of e-mail with image data attached thereto, but the present invention is not limited to e-mail reception. For example, the present invention is applicable to a display of a received image on a receiving side in a system for transmitting and receiving image information.

Suppose that image data of an image taken in with a camera or the like from the portable terminal on a sending side are to be transmitted to the portable terminal on the receiving side so that the image data can be displayed on the receiving side. Suppose further that character data of attached information, such as the time and date of the photographed image, and the name of the image sender, are transmitted together with the image data. In such a system, the character data of the attached information, such as the time and date of the photographed image and the name of the image sender, are displayed on the receiving side by overlapping the character data and the image data. Upon overlapping the character data and the image data, the image-size adjustment and the brightness and/or contrast correction are done. Character color of the additional information may also be adjusted to make the characters easy to see.

Further, if only the image is displayed, the image may be enlarged or zoomed in by varying the display scale so that detailed portions of the image can be displayed.

According to the embodiment of the present invention, when an e-mail message with image data attached thereto is displayed on the portable terminal the display mode of which is so set that the e-mail text and the image data are overlapped, the image processing/output means 14 adjusts the size of the received image data to match the display area of the display unit 6 so that the characters of the e-mail text will be overlapped upon and displayed against the image. This makes possible a quick check on the image of the e-mail with the image attached thereto together with the e-mail text. Therefore, it is possible to improve the usability of the portable terminal as an e-mail terminal even through it has limited display space compared to a personal computer or PDA, which results in handy access to e-mail with an image or images.

Further, when the image and the characters are overlapped and displayed on the portable terminal according to the present invention, the image processing/output means 14 corrects the brightness and/or contrast of the image. Then, the character setting/output means 15 analyzes the chromaticity of the attached image as the background to select the optimum character color on the basis of the analysis result and correspondence provided in advance to the analysis result. Alternatively, there may be provided the function for changing the character color in accordance with instructions from the user. This makes it possible to make the attached image inconspicuous, or the characters conspicuous, or both, and hence the characters easy to see.

Furthermore, when the mode is to display the attached image only, since the portable terminal of the present invention has the function for varying the display scale, the attached image can be enlarged and displayed so that the user can check detailed portions of the image. In this mode, marks such as arrows are indicated to let the user know that the image can be scrolled, which gives the user easy-to-understand operability.

Furthermore, the portable terminal of the present invention is not limited to the display of e-mail with an image or images attached thereto, and it is applicable to the display of image data with character data of additional information such as the time and date of the photographed image and the name of the sender.

The above-described functions according to the present invention can be performed on software executed by the control unit 10, which makes it possible to provide the functions without expanding the existing configuration.

According to one aspect of the present invention, the portable terminal is such that the receiver receives the image data and the character data associated with each other, the control unit generates such display data that the associated character data are overlapped upon the image data, and the display unit displays the display data. This makes it possible to display the received image and character data on one screen in an easy-to-see manner, and hence improve its usability.

According to another aspect of the present invention, the portable terminal handles the character data that are character data of an e-mail text and the image data that are image data attached to the e-mail. This makes it possible to display the character data of the e-mail together with the image data attached to the e-mail on one screen in an easy-to-see manner, and hence improve its usability.

According to still another aspect of the present invention, the portable terminal is such that the control unit converts the received image data into image data of a size corresponding to that of the display area of the display unit to generate display data. Therefore, even if the display area is smaller than the size of the received image data, the received image and character data can be displayed on one screen in an easy-to-see manner, thus improving its usability.

According to yet another aspect of the present invention, the portable terminal is such that the control unit processes the received image data to correct either or both of the brightness and contrast thereof to generate display data. Therefore, when the character data are overlapped upon and displayed against the background of the received image data, the image data are made inconspicuous. This makes it possible to display the character data in an easy-to-see manner even in such bad condition that they are overlapped upon the image, and hence improve its usability.

According to yet another aspect of the present invention, the portable terminal is such that the control unit sets display color of the character data according to the chromaticity of the image data to generate display data. Therefore, when the character data are overlapped upon and displayed against the background of the received image data, the image data are made inconspicuous. This makes it possible to display the character data in an easy-to-see manner even in such bad condition that they are overlapped with the image, and hence improve its usability.

According to still another aspect of the present invention, the portable terminal is such that when two or more kinds of image data are received, the control unit switches the image data to be displayed as the background in accordance with user.s operation on the input unit. This makes it easy to change the image data to be displayed as the background, thus improving its usability.

What is claim is:

1. A portable terminal comprising:

a receiver for receiving image data attached to an e-mail and character data of the e-mail transmitted in association with each other;

a memory unit for storing the character data and the image data in association with each other;

an input unit for inputting instruction;

a control unit for generating display data from the received image data and the character data; and a display unit for displaying the display data, wherein
   when the instruction for displaying the received e-mail is inputted from said input unit said control unit determines whether or not a file is attached to the e-mail, if a file is attached, determines whether or not an attached file is an image file, if the attached file is an image file, reads out the character data and the image data in association with each other from said memory unit, converts the image data into image data of a size corresponding to that of the display area of said display unit, processes the received image data to correct either or both of the brightness and contrast, and generates the display data in such a manner that the associated character are overlapped upon and displayed against the image displayed by the image data.

2. The portable terminal according to claim 1, wherein said control unit sets display color of the received character according to chromaticity of the image data to generate the display data.

3. The portable terminal according to claim 1, wherein said control unit makes two or more display colors of the received character data changeable in accordance with user's operation on said input unit.

4. The portable terminal according to claim 1, wherein when two or more kinds of image data are received, said control unit makes the image data to be displayed as the background changeable in accordance with user's operation on said input unit.

5. The portable terminal according to claim 1, wherein said control unit makes the received image data changeable in scale when the image data are converted into image data of a size corresponding to that of the display area of said display unit so that part of the image data not to be displayed on the display area at a time can be displayed by scrolling.

* * * * *